US009934230B1

(12) United States Patent
Roy et al.

(10) Patent No.: US 9,934,230 B1
(45) Date of Patent: Apr. 3, 2018

(54) DELEGATIONS FOR NON-REGULAR FILES (71) Applicant: NetApp, Inc., Sunnyvale, CA (US)

(72) Inventors: Dipankar Roy, Cupertino, CA (US); Andrew Narver, Mountain View, CA (US); Robert Wyckoff Hyer, Jr., Seven Fields, PA (US)

(73) Assignee: NetApp, Inc., Sunnyvale, CA (US)

( * ) Notice: Subject to any disclaimer, the term of this patent is extended or adjusted under 35 U.S.C. 154(b) by 704 days.

(21) Appl. No.: 13/780,716

(22) Filed: Feb. 28, 2013

(51) Int. Cl.
G06F 17/30 (2006.01)

(52) U.S. Cl.
CPC .............................. G06F 17/30132 (2013.01)

(58) Field of Classification Search
CPC .................................. G06F 17/30; G06F 9/52
See application file for complete search history.

(56) References Cited

U.S. PATENT DOCUMENTS

| 5,805,809 | A   | * | 9/1998  | Singh ................... G06F 12/0813 707/E17.01 |
| 5,819,292 | A   |   | 10/1998 | Hitz et al. |
| 7,010,655 | B1  | * | 3/2006  | Harmer et al. ................ 711/163 |
| 7,010,665 | B1  | * | 3/2006  | Toll ..................... G06F 9/30003 711/215 |
| 7,162,486 | B2  |   | 1/2007  | Patel et al. |
| 7,171,469 | B2  |   | 1/2007  | Ackaouy et al. |
| 7,313,557 | B1  | * | 12/2007 | Noveck ............. G06F 17/30171 |
| 7,409,494 | B2  |   | 8/2008  | Edwards et al. |
| 7,552,223 | B1  |   | 6/2009  | Ackaouy et al. |
| 7,730,258 | B1  | * | 6/2010  | Smith ................... G06F 3/0622 711/114 |
| 2003/0182285 | A1 | * | 9/2003  | Kuwata ............... G06F 17/3089 |
| 2004/0059866 | A1 | * | 3/2004  | Patel ................. G06F 17/30067 711/100 |
| 2007/0250551 | A1 | * | 10/2007 | Lango ............... G06F 17/30067 |
| 2010/0017409 | A1 | * | 1/2010  | Rawat ............... G06F 17/30171 707/E17.007 |

OTHER PUBLICATIONS

Godbole, "An Introduction to FlexCache Volumes, Implementing File Caching on Filers", Network Appliance, TR3399, May 2005.*
Godbole, (An Introduction to FlexCache Volumes for Implementing File Caching on Filers, Network Appliance, TR3399, May 2005).*
Godbole, Rajesh, *An Introduction to FlexCache Volumes, Implementing File Caching on Filers*, Network Appliance, TR3399, May 2005.

* cited by examiner

*Primary Examiner* — Etienne Leroux
*Assistant Examiner* — Farhad Agharahimi
(74) *Attorney, Agent, or Firm* — LeClairRyan, a Professional Corporation (57) ABSTRACT

Embodiments described herein enable a storage system configured with a cache, i.e., a caching storage system, to obtain soft locks on a plurality of files, including non-regular file types, supported by a plurality of file access protocols. The cache is illustratively embodied as a flexible volume configured to temporarily store information, such as contents of the files, through replication of attributes and data of the files from an origin storage system. The soft locks are illustratively implemented as delegations; a delegation on a file enables the caching storage system to serve the attributes and the data for the file without verifying validity of the data with the origin storage system.

18 Claims, 8 Drawing Sheets

DELEGATIONS FOR NON-REGULAR FILES

BACKGROUND

Technical Field

The present disclosure relates to delegations and, more specifically, to delegations for non-regular files supported by file access protocols of a storage system.

Background Information

A storage system typically includes one or more storage devices, such as disks, into which information may be entered, and from which information may be obtained, as desired. The storage system may also include a storage operating system that functionally organizes the system by, inter alia, invoking storage operations in support of storage services implemented by the system. The storage operating system may further implement a high-level module, such as a file system, to logically organize the information stored on the disks as a hierarchical structure of data containers, such as files. For example, each file may be implemented as set of data structures, such as an inode that contains attributes describing the file and data blocks that store data for the file. The attributes describing the file may include a type of file, such as a regular file. Note that, as used herein, a regular file is distinguishable from a special (or non-regular) file, such as a directory, symbolic link, junction, soft link, hard link, device file, character file and/or first-in, first-out device.

The storage system may be implemented in accordance with a variety of storage architectures including, but not limited to, a network-attached storage environment, a storage area network and/or a plurality of interconnected storage systems. The storage system may be further configured to operate according to a client/server model of information delivery to thereby allow many clients to access services and/or resources served by the storage system. For example, users of the clients may utilize, e.g., Unix® computer platforms while others may use Windows™ platforms, to access a shared resource, such as a file, via a protocol server (i.e., an application service) of the storage system.

In some client/server arrangements, the storage system may be configured with a cache that temporarily stores previously-accessed or frequently-accessed information, such as client information. The cache may store the client information, e.g., contents of a file, by replicating the file contents from an origin of the client information, such as disks of the storage system. Replication of the file contents denotes copying the inode (i.e., attributes) and data blocks (i.e., data) of the file. In an environment having a plurality of interconnected storage systems, one of the storage systems that is configured with a cache (i.e., the cache) may be physically situated closer to one or more clients than another storage system that stores the on-disk client information (i.e., the origin). As such, the cache may provide the clients with faster access to the client information than if they were to access the same information directly from the origin.

File access protocols, such as the Network File System (NFS) version 4 (NFS v4) and the Common Internet File System (CIFS), include soft lock capabilities. A soft lock is a software mechanism that enables the origin to prevent access to a shared resource, such as a file. In response to a request by a client desiring to access the shared resource, the cache may obtain the soft lock over the resource, which prevents others from accessing the resource at the origin. In the examples of NFS v4 and CIFS, the soft lock capabilities may be implemented as delegations. Delegations may be utilized to, inter alia, reduce latency by permitting operations to be performed locally on the resource (file) by the cache and to reduce conflicts among other caches and/or storage systems attempting to access that file. If a request is received that conflicts with a previously issued delegation, the storage system transmits a request to the cache holding the delegation to release the soft lock.

Often, the cache may be configured to serve the data of a file, including non-regular files, for a period of time without having to replicate the file contents. This period of time, which is a "time to live" or TTL, may typically be set (as a default) for 15 seconds. However, the cache may alternately be configured with a TTL of 0 seconds, thus necessitating validation of the file contents, including the data and attributes of the file, every time the inode of the file is accessed on the cache. The frequency of such replication impacts the performance of the cache. It is therefore desirable to improve the performance of a cache to provide support for delegations on file types, such as non-regular files, supported by CIFS and NFS v4 protocols.

SUMMARY

Embodiments described herein enable a storage system configured with a cache, i.e., a caching storage system, to obtain soft locks on a plurality of files, such as non-regular file types, supported by a plurality of file access protocols. The cache is illustratively embodied as a flexible volume configured to temporarily store information, such as contents of the files, through replication of attributes and data of the files from an origin storage system. The soft locks are illustratively implemented as delegations; as used herein, a delegation on a file enables the caching storage system to serve the attributes and the data for the file without verifying validity of the data with the origin storage system.

In one or more embodiments, the caching storage system is configured to extend delegations to certain non-regular files, such as directories, symbolic links, junctions, soft links, hard links, device files, character files and first-in, first-out devices. In addition, the caching storage system is configured to provide delegation-like behavior to other non-regular files, such as streams (and stream directories) and access control lists (ACLs). Each of these other non-regular files is configured to reference (link to) one or more regular files, i.e., a base file. That is, inodes of these other non-regular files are linked to the inodes of their referenced regular files, thus rendering the referenced regular files as base files. The delegation-like behavior is illustratively provided by using a delegation status of the base file to determine whether the other non-regular files are delegated. Since the inodes of these other non-regular files are linked to their base file inodes, the embodiments herein leverage the status of the base file delegations to determine whether the inode types can be considered delegated as well.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF ILLUSTRATIVE EMBODIMENTS

The embodiments described herein are directed to a storage system configured with a cache (caching storage system) that temporarily stores previously-accessed or frequently-accessed information, such as client information. The caching storage system may be implemented in accordance with a variety of storage architectures including, but not limited to, a network-attached storage environment, storage area network and/or a plurality of storage systems interconnected as a cluster. However, in an embodiment described herein, the caching storage system is illustratively implemented in a caching system environment.

Figure 1:
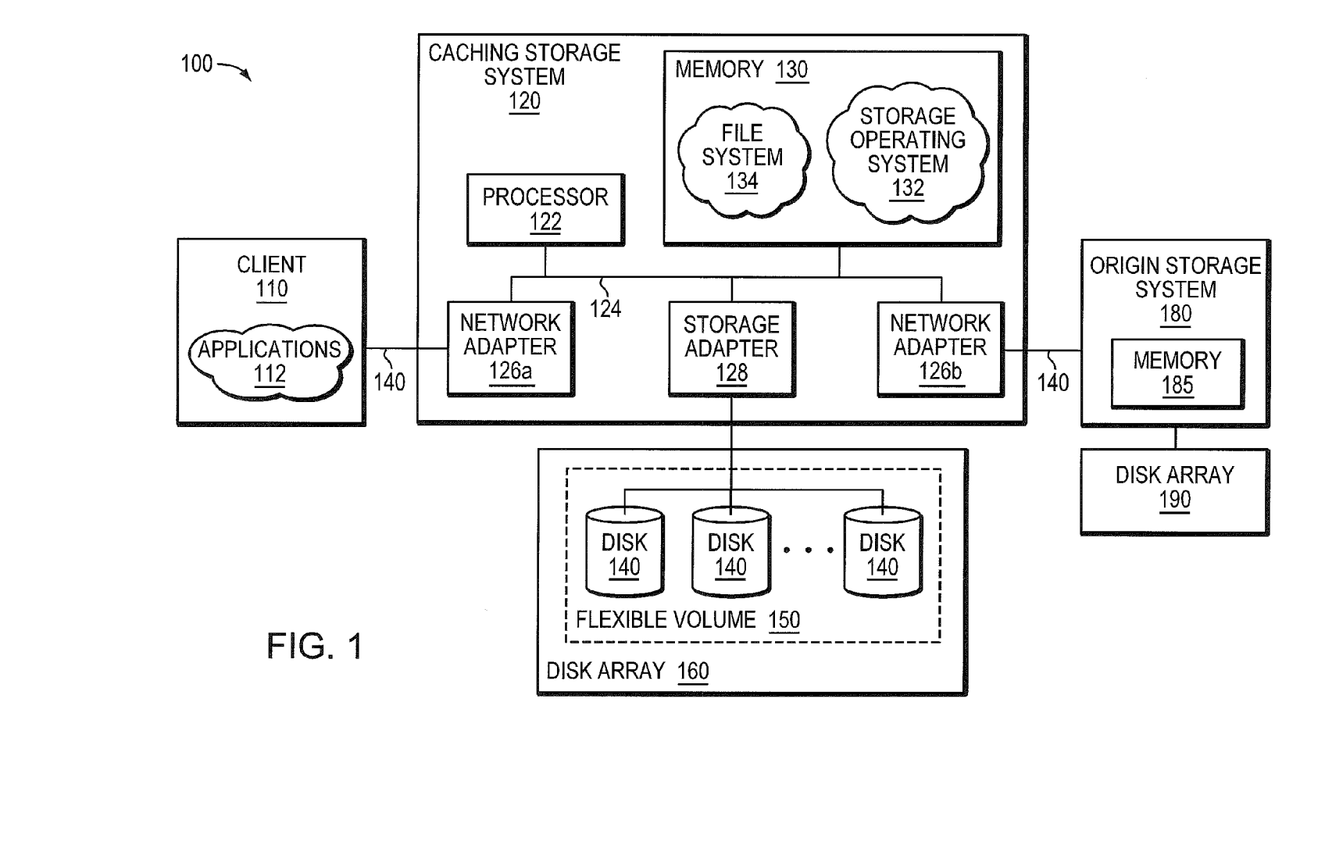
FIG. 1 is a block diagram of a caching system environment.

FIG. 1 is a block diagram of a caching system environment 100 that includes a first storage system configured as the caching storage system 120 to serve information stored on (i.e., served from) a second storage system configured as an origin storage system 180. To that end, the caching storage system is illustratively embodied as a computer configured to provide storage service relating to the organization of information on storage devices, such as disks 140 of a disk array 160. The caching storage system 120 may include a processor 122, a memory 130, one or more network adapters 126a,b and a storage adapter 128 interconnected by a system bus 124. The caching storage system 120 may also include a storage operating system 132 that may illustratively implement a high-level module, such as a file system 134, to logically organize the information as files, including regular and non-regular files, on the disks.

The memory 130 includes a plurality of storage locations addressable by the processor and/or adapters for storing software programs (e.g., processes and/or services) and data structures associated with the embodiments described herein. The processor and adapters may, in turn, include processing elements and/or logic circuitry configured to execute the software programs and manipulate the data structures. Storage operating system 132, portions of which are typically resident in the memory 130 and executed by the processor 122, functionally organizes the caching storage system 120 by, inter alia, invoking operations in support of the software processes and/or services executing on the system. It will be apparent to those skilled in the art that other processing and memory means, including various computer readable media, may be used for storing and executing program instructions pertaining to the embodiments described herein.

The network adapters 126a, b (hereinafter referred to generally as "network adapter 126") include the mechanical, electrical and signaling circuitry needed to connect the caching storage system 120 to a client 110 and to the origin storage system 180 over a computer network 140, which may comprise a point-to-point connection or a shared medium, such as a local area network (LAN) or wide area network (WAN). Illustratively, the computer network 140 may be embodied as an Ethernet network or a Fibre Channel (FC) network. The client 110 may communicate with the caching storage system 120 over network 140 by exchanging discrete frames or packets of data according to predefined protocols, such as the Transmission Control Protocol/Internet Protocol (TCP/IP).

The client 110 may be a general-purpose computer configured to execute applications 112. Moreover, the client 110 may interact with the storage systems in accordance with a client/server model of information delivery. That is, the client may request the services of the storage system, and the storage system may return the results of the services requested by the client, by exchanging packets over the network 140. The clients may issue packets including file-based access protocols, such as the Common Internet File System (CIFS) protocol or Network File System version 4 (NFS v4) protocol, over TCP/IP when accessing information in the form of files.

The storage adapter 128 may cooperate with the storage operating system 132 executing on the caching storage system 120 to access (e.g., retrieve via a read operation or store via a write operation) information requested by a user (or client). The storage adapter 128 may include I/O interface circuitry that couples to the disks 140 over an I/O interconnect arrangement, such as a conventional high-performance, FC serial link topology. The information may be retrieved or stored on disk 140 by the storage adapter and, upon completion, either the retrieved information or an acknowledgement (generated by the processor 122 or the adapter 128) may be forwarded over the bus 124 to the network adapter 126, where it is formatted into one or more packets or messages and forwarded to the client.

Storage of information on disk array 160 may be implemented as storage "volumes" that are illustratively embodied as virtual volumes and further organized as one or more aggregates of the array. Aggregates and virtual volumes are disclosed and described in U.S. Pat. No. 7,409,494 titled Extension of Write Anywhere File System Layout, by John K. Edwards et al. and issued on Aug. 5, 2008. Briefly, an aggregate includes one or more groups of disks, such as Redundant Array of Independent (or Inexpensive) Disks (RAID) groups, that are apportioned by the file system into one or more virtual volumes (hereinafter flexible volumes 150) of the storage system. Each flexible volume has its own logical properties, such as "point-in-time" data image (i.e., snapshot) operation functionality, while utilizing algorithms of the file system implementation.

In an embodiment, the storage operating system 132 is illustratively the NetApp® Data ONTAP™ operating system available from NetApp, Inc., Sunnyvale, Calif. that implements a Write Anywhere File Layout (WAFL™) file system. In addition, the flexible volume 150 is illustratively a FlexCache volume available from NetApp, Inc. However, it is expressly contemplated that any appropriate storage operating system and/or flexible volume may be enhanced for use in accordance with the principles described herein. As such, where the term "WAFL" is employed, it should be taken broadly to refer to any file system that is otherwise adaptable to the disclosure herein.

The origin storage system 180 is illustratively embodied as a computer that, like caching storage system 120, provides storage service relating to the organization of information on disks. The origin storage system 180 is operatively interconnected with the caching storage system 120 over network 140 and generally includes components, such as memory 185 and disk array 190, similar to those of the caching storage system 120. However, the origin storage system 180 may execute a storage operating system that adapts that storage system for use as an origin storage system. In an embodiment described further herein, there may be a plurality of caching storage systems 120 coupled to origin storage system 180 in caching system environment 100.

Figure 2:
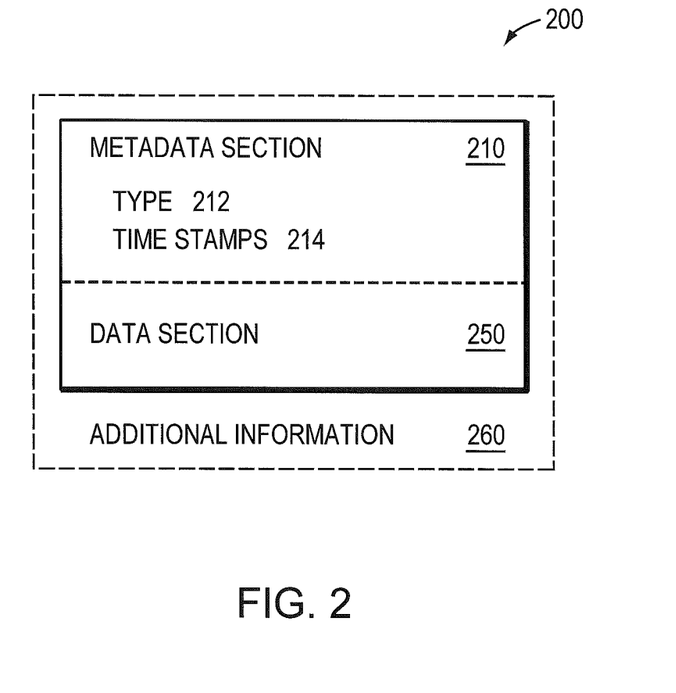
FIG. 2 is a block diagram of an inode.

In one or more embodiments, a file is represented in the file system as an inode data structure adapted for storage on the disks 140. FIG. 2 is a block diagram of an inode 200, which illustratively includes a metadata section 210 and a data section 250. The information stored in the metadata section 210 of each inode 200 describes the file and, as such, includes attributes such as, for example, a type (e.g., regular, directory, stream) 212 of file and one or more time stamps (e.g., access and/or modification times) 214 for the file. The contents of the data section 250 of each inode, however, may be interpreted differently depending upon the type of file (inode) defined within the type field 212. For example, the data section 250 of a directory inode contains metadata controlled by the file system, whereas the data section of a regular inode contains file system data. In this latter case, the data section 250 includes a representation of the data associated with the file and, in an embodiment, may include pointers referencing data blocks on disk used to store the data for the file.

When an on-disk inode (or block) is loaded from disk 140 into memory 130, its corresponding incore structure embeds the on-disk structure. For example, the dotted line surrounding the inode 200 indicates the incore representation of the on-disk inode structure. The incore structure is a block of memory that stores the on-disk structure plus additional information 260 needed to manage data in the memory (but not on disk). The incore and on-disk format structures, including inodes, of an illustrative file system, such as the WAFL file system, are disclosed and described in U.S. Pat. No. 5,819,292 titled Method for Maintaining Consistent States of a File System and for Creating User-Accessible Read-Only Copies of a File System by David Hitz et al., issued on Oct. 6, 1998.

In one or more embodiments, the caching storage system 120 is illustratively configured to temporarily store previously-accessed or frequently-accessed information, such as client information, on a cache embodied as flexible volume 150. The client information, e.g., contents of a file, are stored on the flexible volume 150 by replicating the file contents from an origin of the client information, such as the origin storage system 180. Replication of the file contents denotes copying the inode (i.e., attributes) and data blocks (i.e., data) of the file. When replicating or "caching" the inodes, the caching storage system illustratively fetches attributes for those inodes from the origin storage system. Examples of the attributes include time stamps, such as a time the inode was created and a time the inode was modified, as well as other examples described herein. In the case of the caching system environment 100, one or more clients 110 may be physically situated closer to the caching storage system 120 than to the origin storage system 180. As such, the caching storage system may provide the clients with faster access to the client information than if they were to access the same information directly from the origin.

Embodiments described herein enable the flexible volume of the caching storage system to obtain soft locks on a plurality of files, such as non-regular file types, supported by a plurality of file access protocols. The soft locks are illustratively implemented as delegations; as used herein, a delegation on a file enables the caching storage system to serve the attributes and the data for the file without verifying validity of the data with the origin storage system. Broadly stated, a delegation is a guarantee, given to the caching storage system by the origin storage system, that the data for the inode is valid as long as the flexible volume holds the delegation. Essentially, the guarantee assures the caching storage system that it does not have to re-verify any of the inode attributes as long as it holds the delegation. Illustratively, the delegation is implemented as a lock on the file that the origin storage system provides to the caching storage system and that enables the caching storage system to have read access to the data of the file on the flexible volume, as long as the lock is valid. If a modify operation is requested for the data of the file, the origin storage system revokes the lock on the file and, in response, the caching storage system relinquishes the delegation.

Non-Regular Files

Figure 3:
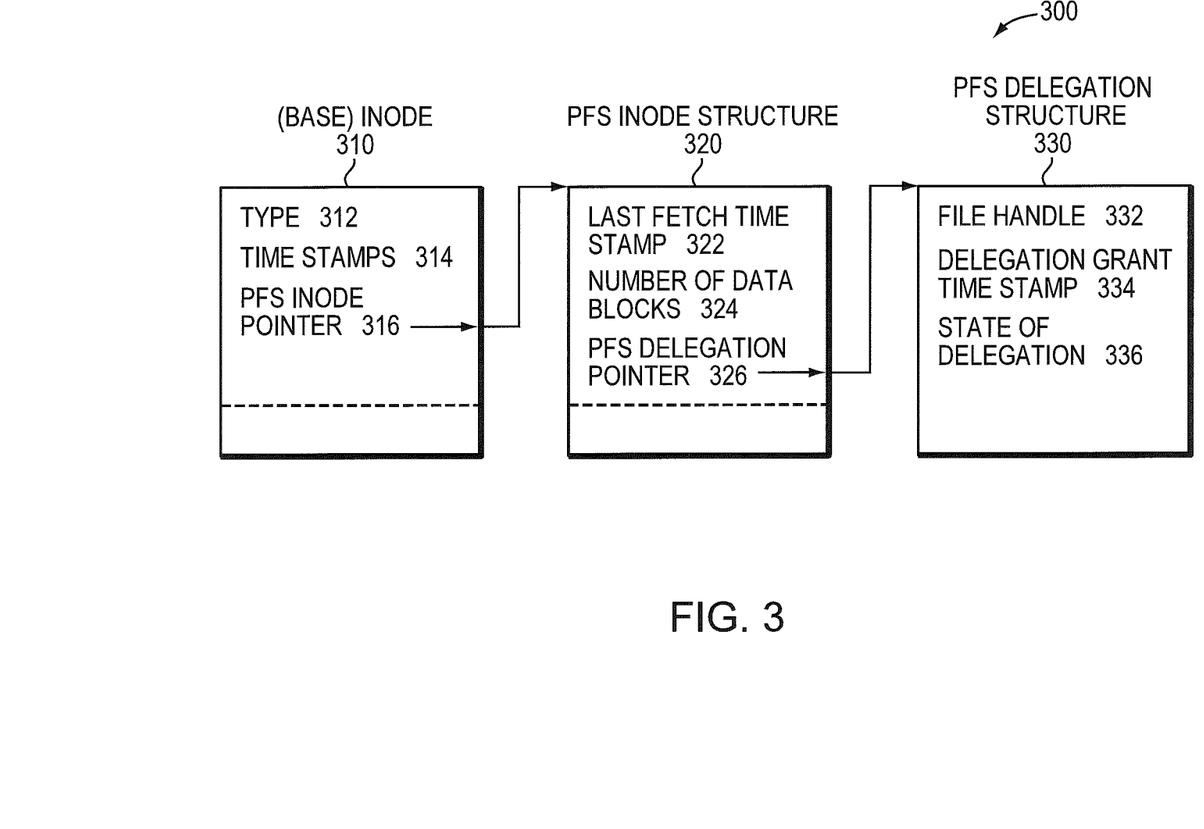
FIG. 3 is a block diagram of an incore layout configured to extend delegations to non-regular files.

In one or more embodiments, the caching storage system is configured to extend delegations to certain non-regular files such as, e.g., directories, symbolic links, junctions, soft links, hard links, device files, character files and first-in, first-out (FIFO) devices. FIG. 3 is a block diagram of an incore layout 300 configured to extend delegations to such non-regular files. To that end, the incore layout 300 includes data structures located within memory 130 of the caching storage system 120. The data structures of the incore layout 300 illustratively include a (base) inode 310, similar to inode 200, with a type field 312 specifying the non-regular file type and one or more time stamps 314. Illustratively, inode 310 includes a proxy file system (PFS) inode pointer 316 that references (points to) a PFS inode structure 320. The PFS inode structure 320 is illustratively a data structure that is created in memory 130 when an inode, such as inode 310, is loaded in the memory from the flexible volume 150. In an embodiment, the PFS inode structure 320 is also created when an inode, such as a base inode for a stream or ACL inode described further herein, is loaded in the memory 130 from the flexible volume 150.

Illustratively, the PFS inode structure 320 contains information specific to the flexible volume 150, including a last fetch time stamp 322 of the non-regular file (i.e., the last time the inode 310 was fetched from the origin storage system) and a number of data blocks 324 representing the number of data blocks of the file stored on the flexible volume. When the inode 310 is fetched from the origin storage system, the last fetch time stamp 322 is updated to indicate that the inode attributes are current as of that particular time stamp. When fetching the inode 310, the caching storage system 120 also fetches any required data blocks of the file from the origin storage system. Thus, the PFS inode structure 320 keeps tracks of the number of blocks of data fetched, as well as the time (not shown) when those blocks were stored (filled) on the flexible volume.

The PFS inode structure 320 also illustratively contains a PFS delegation pointer 326 that references a PFS delegation structure 330. The PFS delegation structure 330 is illustratively a data structure in memory 130 that is configured to contain information relating to delegations granted on the non-regular file. For example, the delegation-related information may include a file handle 332, i.e., an identifier of the non-regular file associated with the delegation, as well as a delegation grant time stamp 334 indicating when the delegation was granted by the origin storage system and a state of the delegation 336. The file handle 332 illustratively includes an inode number used to store and retrieve an inode, such as inode 310, to and from the flexible volume 150 on demand. In an embodiment, the file handle enables the PFS delegation structure 330 to be accessed independently of an inode to determine whether the non-regular file is delegated. That is, by examining the file handle 332 and the state of the delegation 336 in the PFS delegation structure 330, it can be determined whether the file/inode is delegated.

In an embodiment, the delegation may transition through different states. For example, if the caching storage system holds a valid delegation for the file, the state of delegation 336 is set to granted. If a received write request is directed to the file, the caching storage system returns the delegation to the origin storage system and transitions the delegation state 336 to returning. Subsequently, upon receiving a reply from origin storage system that the delegation has been returned, the state of delegation 336 is set to unlocked.

In addition, the caching storage system is configured to provide delegation-like behavior to other non-regular files, such as streams (and stream directories) and access control lists (ACLs). Each of these other non-regular files is configured to reference (link to) one or more regular files, i.e., a base file. That is, inodes of these other non-regular files are linked to the inodes of their referenced regular files, thus rendering the referenced regular files as base files. The delegation-like behavior is illustratively provided by using a delegation status of the base file to determine whether the other non-regular files are delegated, i.e., hold an associated delegation. Since the inodes of these other non-regular files are linked to their base file inodes, the embodiments herein leverage the status of the base file delegations to determine whether the inode types can be considered delegated as well.

Streams and Stream Directories

In one or more embodiments, the file system described herein is configured to support streams and stream directories used to provide a file service for one or more named data streams. An on-disk representation of the streams and stream directories for the file system is disclosed and described in U.S. Pat. No. 7,162,486 titled System and Method for Representing Named Data Streams Within an On-Disk Structure of a File System, by Kayuri Patel et al. and issued on Jan. 9, 2007. Broadly stated, a stream (and stream directory) is a multi-inode storage object that includes a base file inode, a stream directory inode and a stream inode within the file system.

Figure 4:
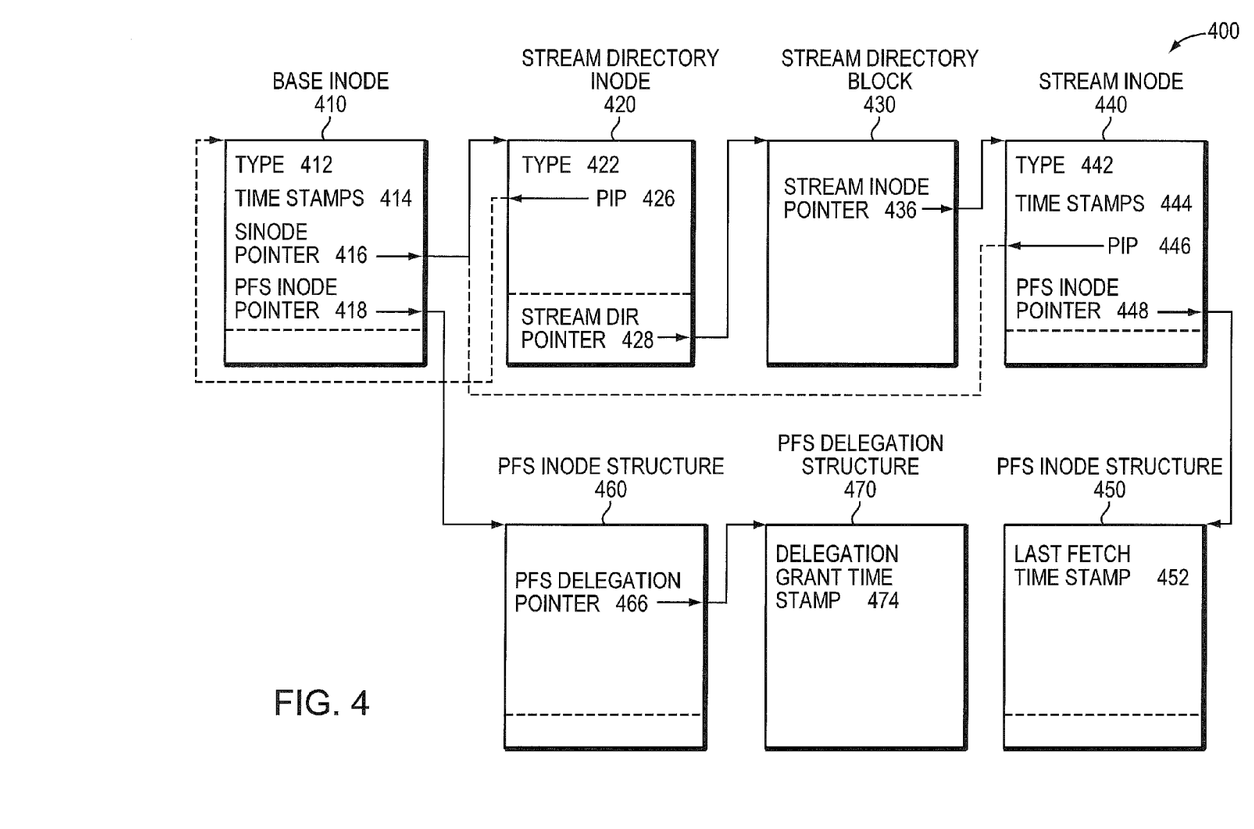
FIG. 4 is a block diagram of an incore layout configured to extend delegations to streams and stream directories.

FIG. 4 is a block diagram of an incore layout 400 configured to extend delegations to the streams (and stream directories). To that end, the incore layout includes data structures located within memory 130 of the caching storage system 120. The data structures of the incore layout 400 illustratively include a base inode 410, similar to inode 200, with a type 412 specifying a regular file type, one or more time stamps 414 (e.g., an access and/or modification time) and a sinode pointer 416 that references a stream directory inode 420. The stream directory inode 420 illustratively includes a type 422 specifying a stream directory (stream_dir) file type and a parent inode pointer (PIP) 426 that references the base inode 410. In an embodiment, the data section of the stream directory inode 420 may include a stream directory block associated with the named data stream. However, for ease of depiction and description, the stream directory block 430 is shown as a separate structure referenced by a stream directory (dir) pointer 428 of the stream directory inode 420. The stream directory data block 430 may include a stream inode pointer 436 that references a stream inode 440 having a type 442 specifying a stream file type, one or more time stamps 444 (e.g., an access and/or modification time) and a PIP pointer 446 referencing the stream directory inode 420.

In one or more embodiments, the status of the base inode 410, i.e., whether or not it is delegated, may be used to determine whether the stream inode 440 (and the stream directory inode 420) are delegated. When a stream (i.e., stream inode 440) is accessed, e.g., modified by a write operation, its metadata (e.g., time stamp 444) is updated, which also impacts the metadata (e.g., time stamp 414) of the base file (e.g., base inode 410). That is, when a write operation is directed to the stream, the time stamp of the stream changes as does the time stamp of the base file. As a result, the base file relinquishes its delegation, if it had one. When a read operation is directed to the stream and its base file does not have a delegation, the stream is not considered delegated. Accordingly, the attributes of the stream and base file are fetched from the origin storage system.

However if the base file has a delegation, then the stream is considered delegated and the read operation to the stream may not require fetching of the attributes to determine whether they have changed. That is, if the delegation on the base inode was obtained after the stream attributes were fetched, it cannot be unequivocally determined whether the contents of the fetched stream are current or whether they changed before or after the base inode delegation was obtained. If the stream contents changed after the delegation was obtained, then the delegation is recalled (revoked) because when the stream is updated, the time stamp on the base file changes, which recalls the base file delegation.

Therefore, additional information, such as a time stamp of when the stream attributes were last fetched (i.e., the last fetch time) as well as a time stamp of when the base file acquired the delegation (i.e., the delegation grant time), are needed to determine whether fetching of the stream attributes is required. It should be noted that the delegation grant time and last fetch time were discussed previously with respect to the non-regular files of FIG. 3. In one or more embodiments, the last fetch time stamp 452 of the stream inode 440 is stored in a PFS inode structure 450 that is illustratively linked to the stream inode via a PFS inode pointer 448 of the stream inode 440. Furthermore, the delegation grant time stamp 474 of the base inode 410 is recorded (stored) in a PFS delegation structure 470, similar to PFS delegation structure 330, that is illustratively linked to the base inode 410 via a PFS inode structure 460.

Figure 5:
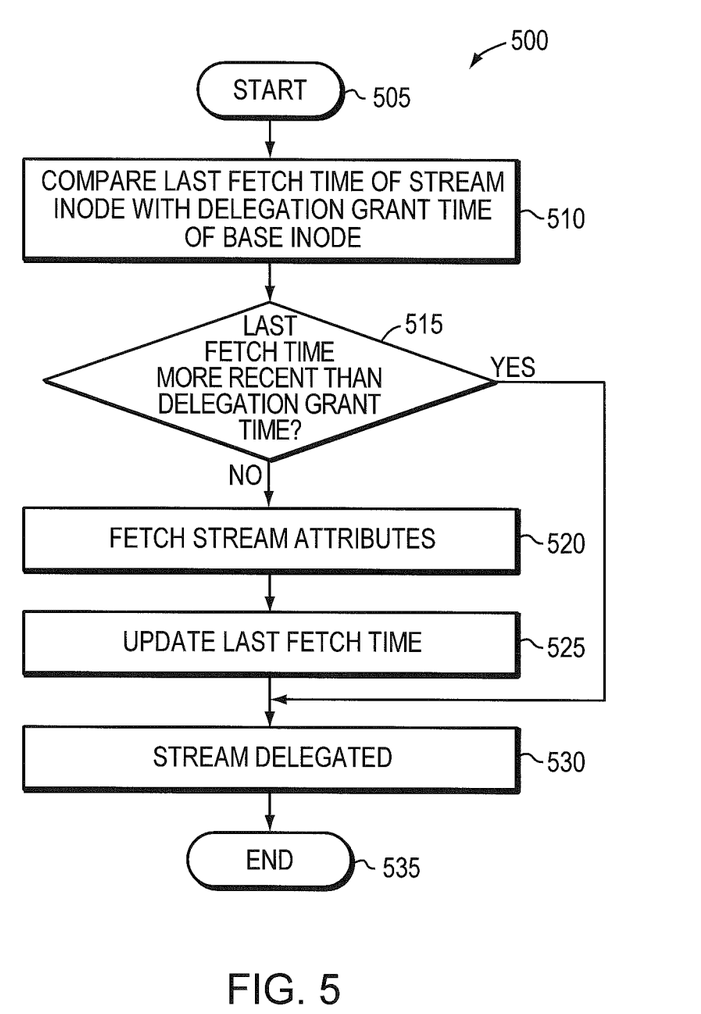
FIG. 5 is an example simplified procedure for determining whether a stream is delegated.

FIG. 5 is an example simplified procedure for determining whether a stream (inode) is delegated. The procedure 500 starts at step 505 and proceeds to step 510 where the last fetch time of the stream inode is compared with the delegation grant time of the base inode. In an embodiment, the file system 134 of the caching storage system 120 may be configured to compare the last fetch time with the delegation grant time to determine the delegation status of the stream inode. At step 515, a determination is made, e.g., by the file system 134, as to whether the last fetch time is more recent than the delegation grant time. If so, the stream is considered delegated at step 530 and there is no need to fetch its attributes. The procedure then ends at Step 535. However, if the last fetch time is not more recent (i.e., is older) than the delegation grant time, then at step 520 the stream attributes are fetched from the origin storage system and the last fetch time is updated at step 525. In step 530, the stream is then delegated, e.g., in response to the stream acquiring a delegation. In an embodiment, the time stamp for the last fetch time of the stream inode is updated to be more recent than the time stamp for the delegation grant time of the base inode, thus obviating a need to fetch the stream attributes again unless a modification occurs. The procedure then ends at step 535.

In sum, if the stream has been modified (so there is no delegation on the base file), the updated data is retrieved, the modify time of the stream inode is updated, and the modify time of the base inode is also updated (e.g., to the same time). If there is a delegation, then depending on when the attributes for the stream were stored on the flexible volume 150, a determination is made as to whether there is a need to fetch those attributes from the origin storage system 180 or consider the stream as delegated. Note that there would not be a need to refetch the attributes if they were fetched after the base file delegation was obtained, and the base file delegation is still valid.

Access Control Lists

In one or more embodiments, access control lists (ACLs) are handled differently than streams because, in the file system described herein, ACLs may be shared across multiple base files. Thus, whenever an existing ACL on a base file is modified, the existing ACL is deleted and replaced by a new ACL that is thereafter linked to the base file(s).

Figure 6:
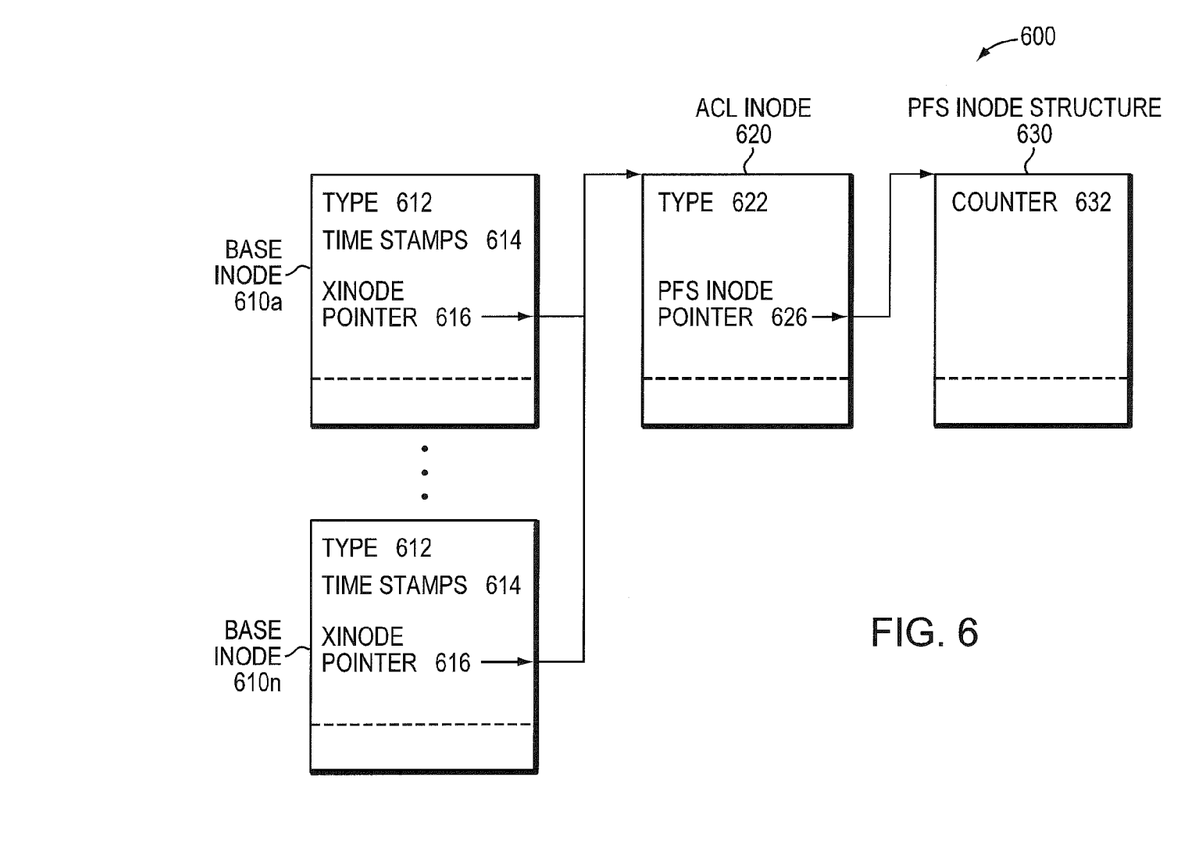
FIG. 6 is a block diagram of an incore layout configured to extend delegations to access control lists (ACLs)

FIG. 6 is a block diagram of an incore layout 600 configured to extend delegations to the ACLs. To that end, the incore layout 600 includes data structures located within memory 130 of the caching storage system 120. The data structures of the incore layout 600 illustratively include one or more base inodes 610*a-n*, similar to inode 200, with a type 612, one or more time stamps 614 (e.g., an access and/or modification time) and an xinode pointer 616 that references an ACL inode 620. Note that the type 612 of the one or more base inodes may specify a regular or non-regular file type. The ACL inode 620 includes a type 622 specifying an ACL file type and a PFS inode pointer 626 that references a PFS inode structure 630 which contains, among other things, a counter 632. In response to creating or obtaining a delegation on the base file, the base file inode 610*a-n* is examined to determine whether it has an xinode 616 referencing the ACL inode 620. If so, a value of the counter 632 in the PFS inode structure 630 (which is illustratively similar to PFS inode structure 320) may be incremented. In addition, the value of the counter 632 may be decremented in response to the delegation being deleted or revoked. Therefore, in an embodiment, the value of the counter 632 is illustratively incremented whenever any of the base file inodes obtain a delegation and decremented whenever a delegation is revoked.

Note that the xinode pointer 616 may be present in multiple base inodes 610*a-n*, so that the ACL inode 620 is essentially shared across a number of files. In an embodiment, the ACL inode 620 is considered delegated if any one of the base inodes 610*a-n* which reference the ACL inode (via the xinode 616) has a delegation. Note that the ACL inode 620 illustratively does not have a back pointer indicating that it is shared across all of the files. Therefore, the embodiments described herein leverage the delegation status of the base inodes 610*a-n* to determine whether the ACL inode 620 (and, thus, the ACL) has a valid delegation and, thus, is delegated.

Figure 7:
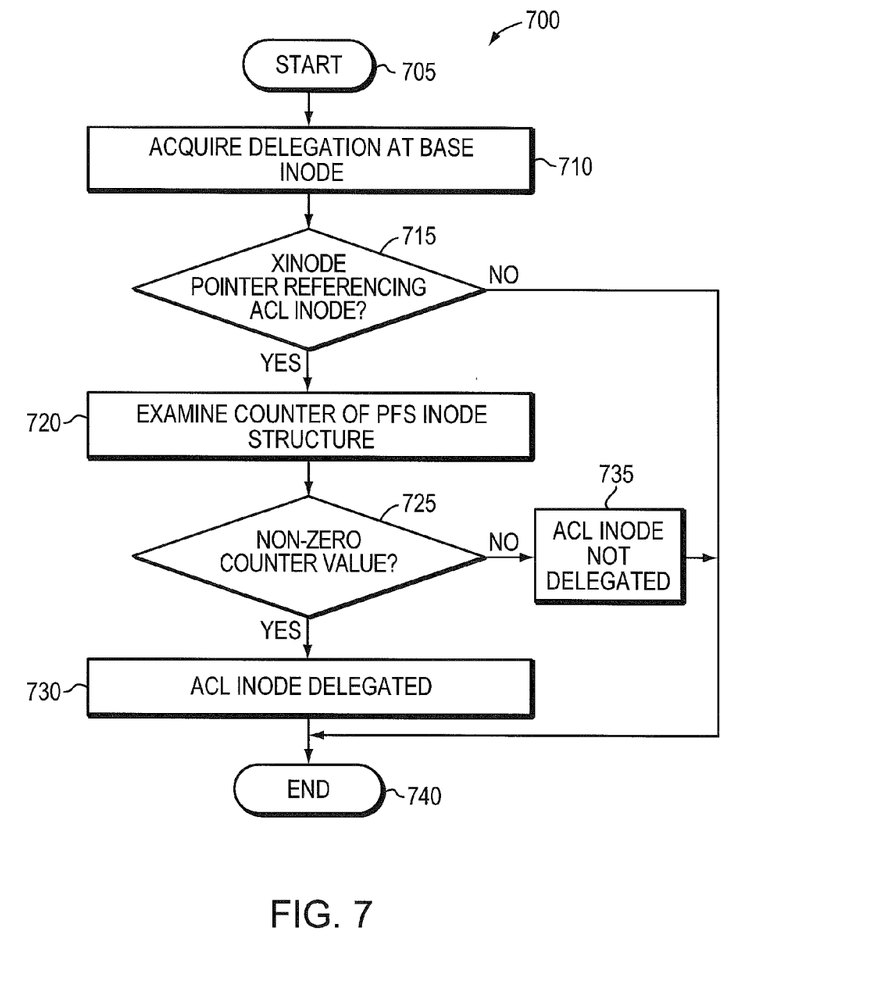
FIG. 7 is an example simplified procedure for determining whether an ACL is delegated.

FIG. 7 is an example simplified procedure for determining whether an ACL (inode) is delegated. The procedure 700 starts at step 705 and proceeds to step 710 where the base inode 610*a-n* acquires a delegation. At step 715, a determination is made, e.g., by the file system 134, as to whether the base inode 610*a-n* has an xinode pointer 616 referencing the ACL inode 620. If not, the procedure ends at step 740. However, if the base inode references the ACL inode, the counter 632 of the PFS inode structure 630, which is linked to the ACL inode 620, is examined (e.g., by the file system) at step 720. In an embodiment, the counter is employed to provide a technique that leverages a delegation status of any of the base files to determine the delegation status of the ACL. At step 725, a determination is made, e.g., by the file system 134, as to whether the counter 632 has a non-zero value. If so, a delegation for the ACL inode 620 exists, i.e., the ACL inode is delegated (step 730). That is, if at least one of the base files is delegated, then the counter 632 has a non-zero value. The procedure then ends at step 740. If the counter 632 does not have a non-zero value (i.e., the counter has a value equal to zero), then the ACL inode is not delegated at step 735. The procedure then ends at step 740. Advantageously, the leveraging technique represents a performance and storage improvement because, in the absence of such leveraging, additional memory and state information would be needed to determine the delegation status of the ACL (inode).

While there have been shown and described embodiments that enable a caching storage system to obtain soft locks (delegations) on a plurality of files, such as non-regular file types, supported by a plurality of file access protocols, it is to be understood that various other adaptations and modifications may be made within the spirit and scope of the embodiments herein. For example, embodiments have been shown and described herein with relation to the incore layout of data structures resident in the memory 130 of the caching storage system 120 and configured to extend delegations to the non-regular file types. However, the embodiments in their broader sense are not so limited, and may, in fact, relate to the incore layout of a lock manager resident in a memory 185 of the origin storage system 180 and configured to also extend delegations to the non-regular file types.

Figure 8:
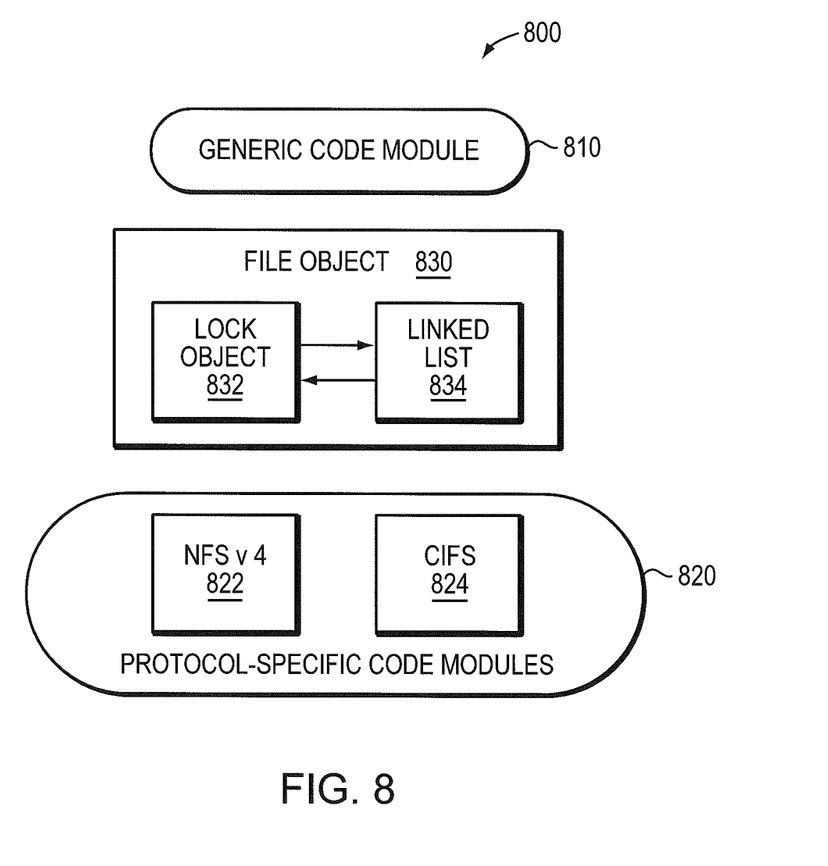
FIG. 8 is a block diagram of a lock manager configured to efficiently manage granting and revoking of delegations.

FIG. 8 is a block diagram of a lock manager 800 configured to efficiently manage granting and revoking of locks, including soft locks implemented as delegations, on files served by the origin storage system 180. An example of a lock manager is disclosed and described in U.S. Pat. No. 7,313,557 titled Multi-Protocol Lock Manager and issued on Dec. 25, 2007. In one or more embodiments, the lock manager 800 includes a generic code module 810, protocol-specific code modules 820 and a file object 830. The generic code module 810 and protocol-specific modules 820 are illustratively configured to provide callouts and associated functions directed to information contained in the file object 830. Illustratively, the protocol-specific code modules include a NFS v4 module 822 and a CIFS module 824, each of which is configured to handle locks according to its specific file access protocol.

In an embodiment, the file object 830 is a data structure containing information, such as lock object 832, that describes a file operated on by the lock manager 800. For example, lock object 832 contains information describing a particular lock on a file, including the current holder (e.g., the caching storage system) of the lock/delegation and a state of the lock (e.g., granted, waiting to be granted, being recalled, revoked, etc.) The lock object 832 may be one of a plurality of lock objects organized as a linked list 834, wherein the other lock objects of the list describe other locks on the file. Illustratively, the lock manager 800 may be extended to include support for delegations as a particular type of lock, e.g., PFS delegation, described by the lock object 832. As a result, the lock manager 800 may examine (i) the lock object 832 to determine whether the type of lock is a PFS delegation and (ii) the file object 830 to determine whether the locked file has changed. If the file has changed (e.g., been modified), the lock manager 800 may recall the delegation from the caching storage system 120 and request that the system 120 release that delegation.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A computing device comprising:
a memory containing a machine readable medium comprising machine executable code having stored thereon instructions for performing a method of delegation for non-regular files;
a processor coupled to the memory, the processor configured to execute the machine executable code to cause the processor to:
obtain fetch time data for a non-regular file maintained in a caching storage system and delegation grant time data linked to at least one base file associated with the non-regular file, wherein the fetch time data comprises a time when attribute data corresponding to the non-regular file was most recently fetched and the delegation grant time data comprises a time when delegation of the base file was most recently granted by an origin storage system;
determine when the time when the attribute data in the non-regular file was most recently fetched is more recent than the time when delegation of the base file was most recently granted based on a comparison of the fetch time data for the non-regular file to the delegation grant time data for the base file;
retrieve updated attribute data corresponding to the non-regular file from the original storage system and update the fetch time data, when the determining indicates that the time when the attribute data in the non-regular file was most recently fetched is not more recent than the time when delegation of the base file was most recently granted; and
serve the attribute data from the caching storage system, when the determining indicates that the time when the attribute data in the non-regular file was most recently fetched is more recent than the time when delegation of the base file was most recently granted.

2. The device of claim 1, wherein the delegation status data comprises an inode associated with the base file.

3. The device of claim 1, wherein the non-regular file comprises a directory, symbolic link, junction, soft link, hard link, device file, character file, or a first-in first-out device.

4. The device of claim 2, wherein the processor is further configured to execute the machine executable code to cause the processor to:
create a proxy file system (PFS) PFS inode structure when the delegation status for the non-regular file is obtained, the PFS inode structure comprising a time stamp indicating the last time when the non-regular file was fetched.

5. The device of claim 1, wherein, the non-regular file comprises an access control list (ACL), wherein the ACL references the non-regular file and is shared among one or more base files comprising the base file.

6. The device of claim 4, wherein the PFS inode structure comprises a counter value and the processor is further configured to execute the machine executable code to cause the processor to:
increment the counter value when the delegation status is obtained and decrement the counter value when the delegation status is revoked.

7. A method comprising:
obtaining, by a computing device, fetch time data for a non-regular file maintained in a caching storage system and delegation grant time data linked to at least one base file associated with the non-regular file, wherein the fetch time data comprises a time when attribute data corresponding to the non-regular file was most recently fetched and the delegation grant time data comprises a time when delegation of the base file was most recently granted by an origin storage system;
determining, by the computing device, when the time when the attribute data in the non-regular file was most recently fetched is more recent than the time when delegation of the base file was most recently granted based on a comparison of the fetch time data for the non-regular file to the delegation grant time data for the base file;
retrieving, by the computing device, updated attribute data corresponding to the non-regular file from the original storage system and update the fetch time data, when the determining indicates that the time when the attribute data in the non-regular file was most recently fetched is not more recent than the time when delegation of the base file was most recently granted; and
serving, by the computing device, the attribute data from the caching storage system, when the determining indicates that the time when the attribute data in the non-regular file was most recently fetched is more recent than the time when delegation of the base file was most recently granted.

8. The method of claim 7 wherein the data comprises an inode associated with the base file.

9. The method of claim 7, wherein the non-regular file comprises an access control list (ACL), wherein the ACL references the non-regular file and is shared among one or more base files comprising the base file.

10. A non-transitory machine readable medium having stored thereon instructions for performing a method comprising machine executable code which when executed by at least one machine, causes the machine to:
obtain fetch time data for a non-regular file maintained in a caching storage system and delegation grant time data linked to at least one base file associated with the non-regular file, wherein the fetch time data comprises a time when attribute data corresponding to the non-regular file was most recently fetched and the delegation grant time data comprises a time when delegation of the base file was most recently granted by an origin storage system;
determine when the time when the attribute data in the non-regular file was most recently fetched is more recent than the time when delegation of the base file was most recently granted based on a comparison of the fetch time data for the non-regular file to the delegation grant time data for the base file;
retrieve updated attribute data corresponding to the non-regular file from the original storage system and update the fetch time data, when the determining indicates that the time when the attribute data in the non-regular file was most recently fetched is not more recent than the time when delegation of the base file was most recently granted; and serve the attribute data from the caching storage system, when the determining indicates that the time when the attribute data in the non-regular file was most recently fetched is more recent than the time when delegation of the base file was most recently granted.

11. The medium of claim 10, wherein the delegation status data comprises an inode associated with the base file.

12. The medium of claim 10, wherein the non-regular file comprises a directory, symbolic link, junction, soft link, hard link, device file, character file, or a first-in first-out device.

13. The medium of claim 11, wherein the machine executable code when executed by the machine, further causes the machine to:

create a proxy file system (PFS) inode structure when the delegation status for the non-regular file is obtained, the PFS inode structure comprising a time stamp indicating the last time when the non-regular file was fetched.

14. The medium of claim 10, wherein the non-regular file comprises an access control list (ACL), wherein the ACL references the non-regular file and is shared among one or more base files comprising the base file.

15. The medium of claim 13, wherein the PFS inode structure comprises a counter value and the machine executable code when executed by the machine, further causes the machine to:

increment the counter value when the delegation status is obtained and decrement the counter value when the delegation status is revoked.

16. The method of claim 7, wherein the non-regular file comprises a directory, symbolic link, junction, soft link, hard link, device file, character file, or a first-in first-out device.

17. The method of claim 8, further comprising:

creating, by the computing device, a proxy file system (PFS) inode structure when the delegation status for the non-regular file is obtained, the PFS inode structure comprising a time stamp indicating the last time when the non-regular file was fetched.

18. The method of claim 17, wherein the PFS inode structure comprises a counter value and further comprising:

increment, by the computing device, the counter value when the delegation status is obtained and decrement the counter value when the delegation status is revoked.

* * * * *